Dec. 15, 1925.  
R. E. WOODSON  
NUT CRACKING MACHINE  
Filed Dec. 22, 1922  
1,565,610  
4 Sheets-Sheet 1
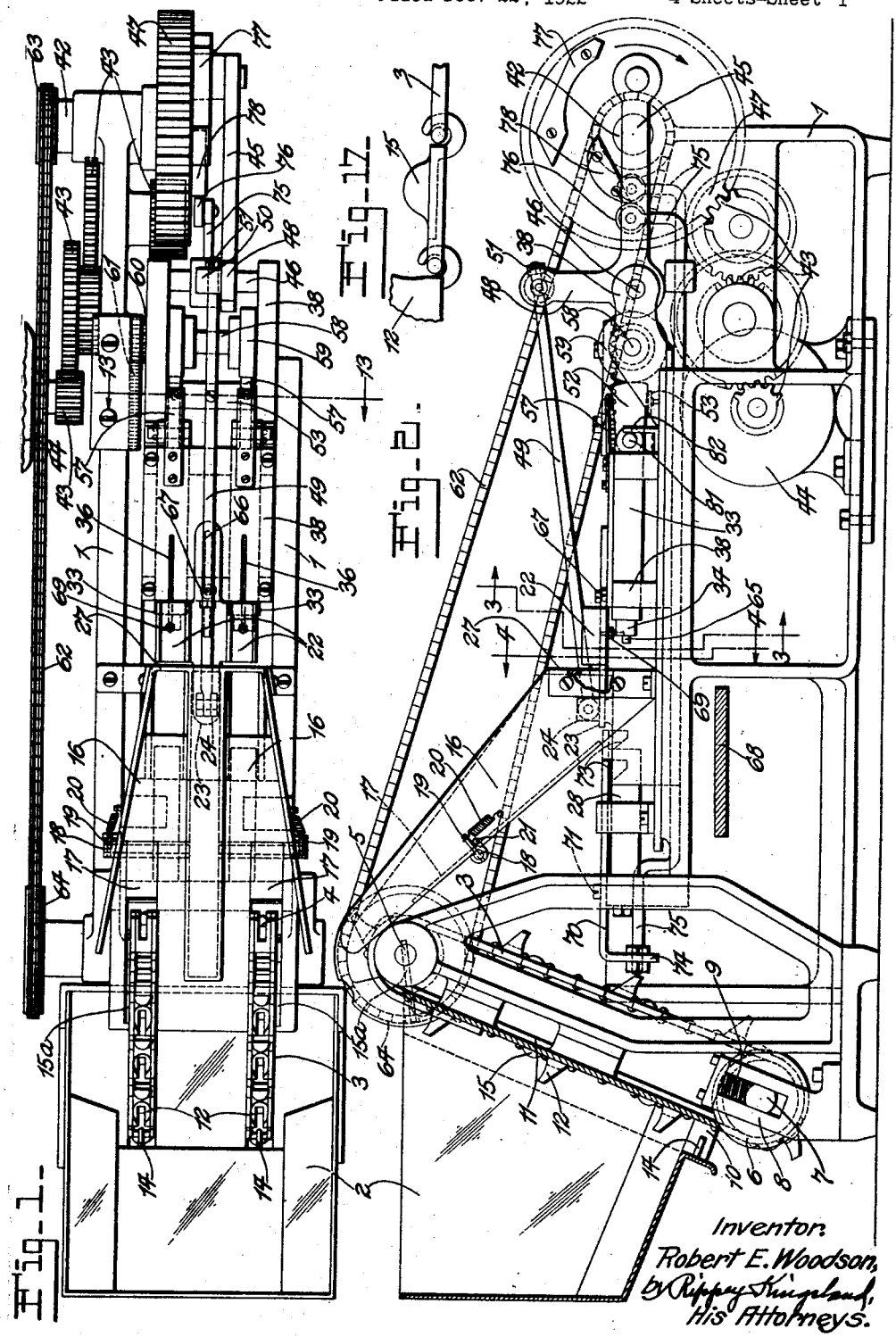
Inventor:
Robert E. Woodson,
by Rippey Kingsland,
His Attorneys.

Dec. 15, 1925.  
R. E. WOODSON  
NUT CRACKING MACHINE  
Filed Dec. 22, 1922       4 Sheets-Sheet 2
1,565,610
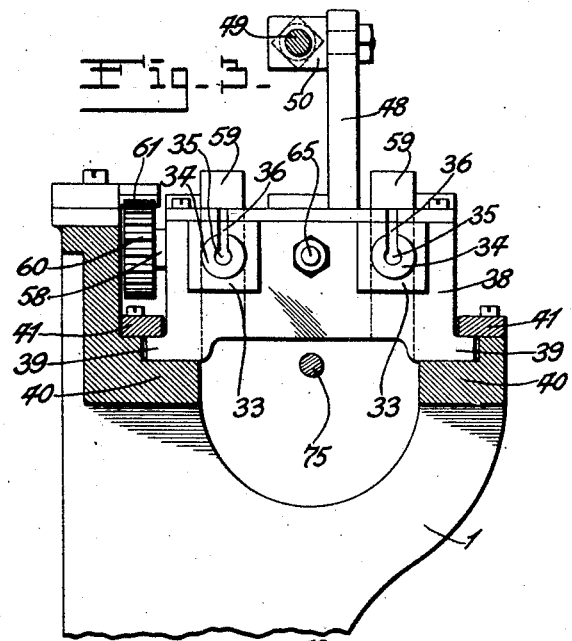
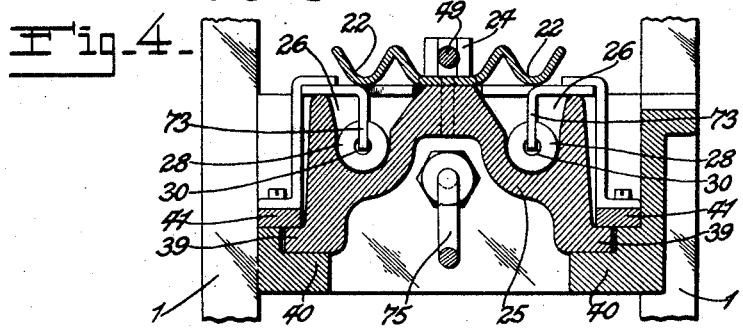
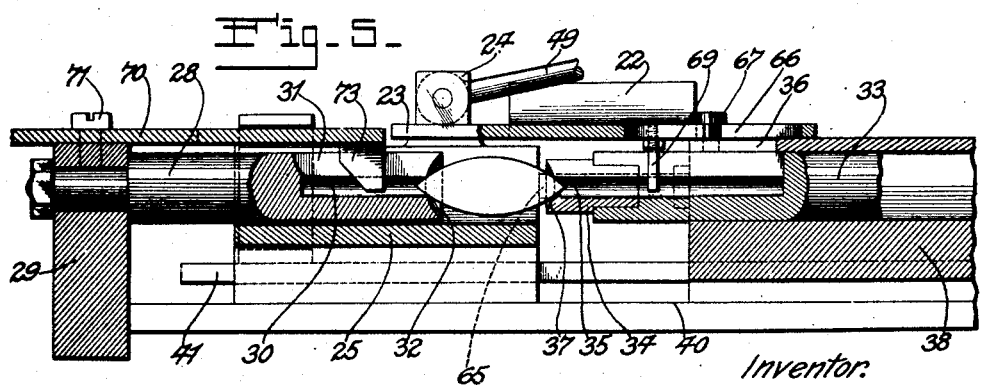
Inventor:
Robert E. Woodson,
by Rippey Kingsland,
His Attorneys.

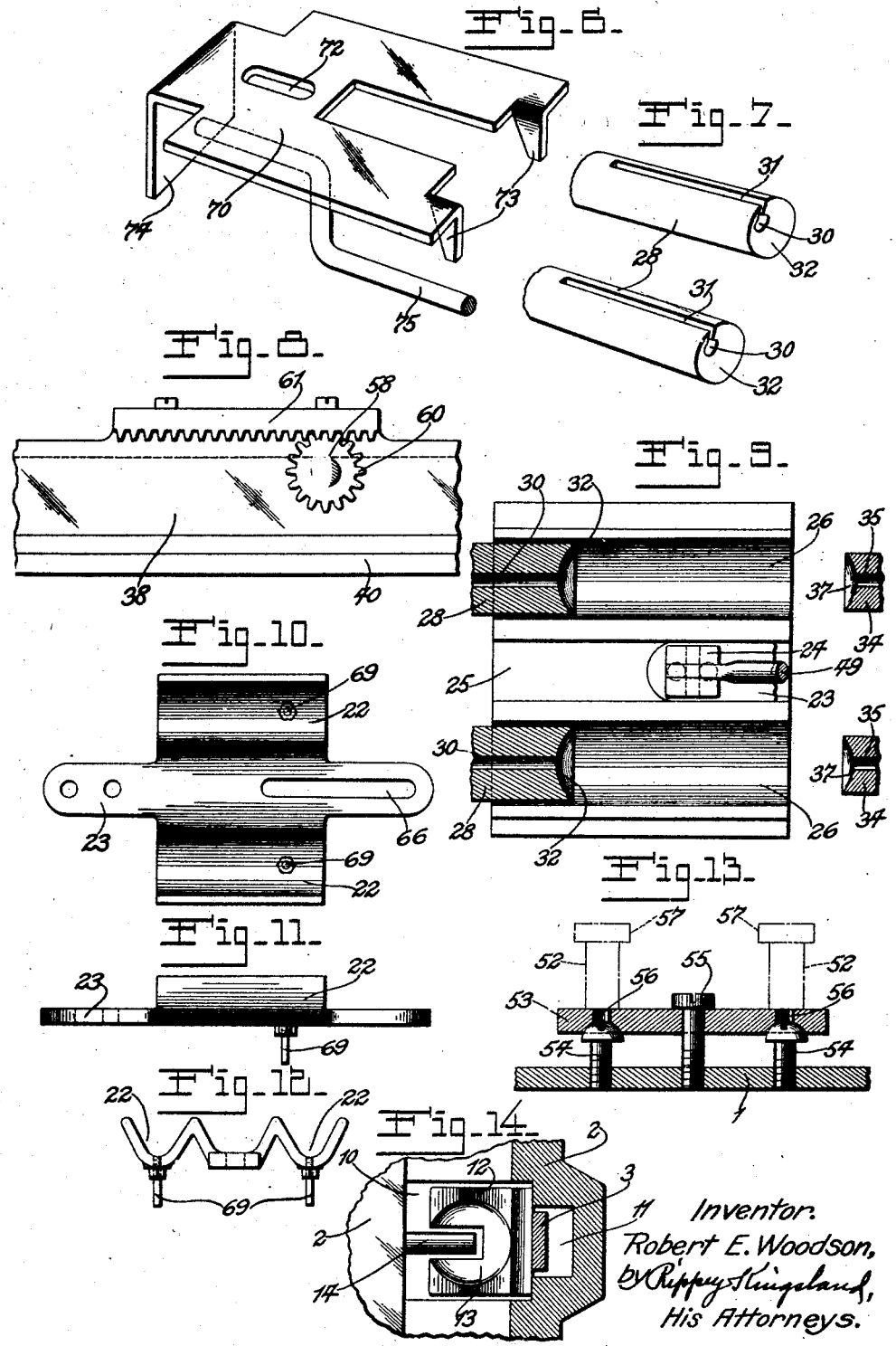

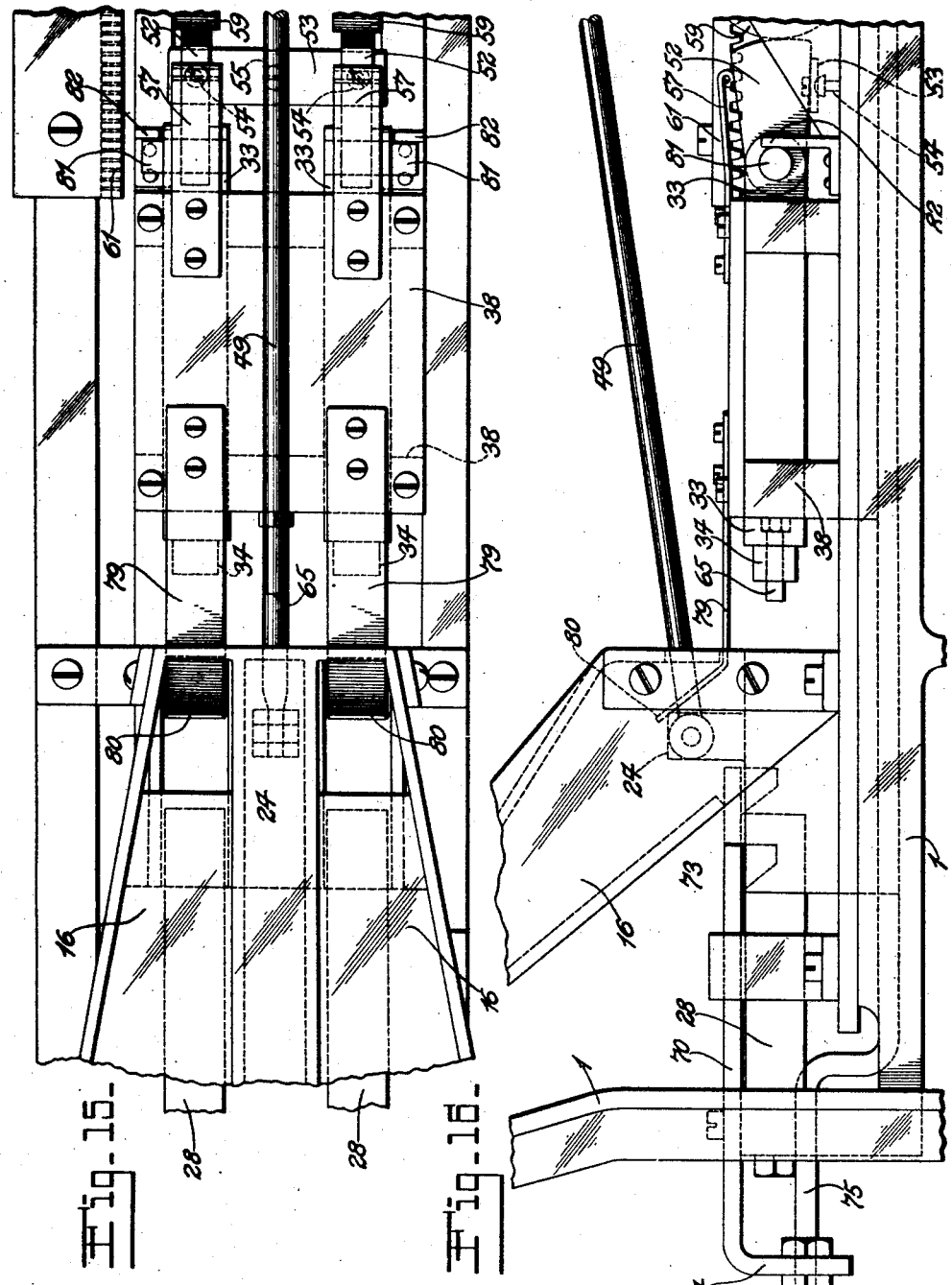

Patented Dec. 15, 1925.

1,565,610

UNITED STATES PATENT OFFICE.

ROBERT E. WOODSON, OF WEBSTER GROVES, MISSOURI.

NUT-CRACKING MACHINE.

Application filed December 22, 1922. Serial No. 608,408.

*To all whom it may concern:*

Be it known that I, ROBERT E. WOODSON, a citizen of the United States, residing at Webster Groves, St. Louis County, Missouri, have invented a new and useful Nut-Cracking Machine, of which the following is a specification.

This invention relates to nut cracking machines, and an object of the invention is to improve the nut cracking mechanism generally as well as the mechanism for delivering the nuts to the nut cracking mechanism.

Another object of the invention is to provide a nut cracking machine designed and adapted for use in cracking the fragile shell nuts such as pecans, as well as the hard shell nuts such as Brazil nuts, walnuts and hickory nuts, as distinguished from machines heretofore designed and adapted for use only in cracking the soft shell nuts.

Another object of the invention is to improve generally the conveyor and other devices for conveying nuts from the hopper to the nut cracking mechanism and placing the nuts properly for operation of the cracking mechanism.

Another object of the invention is to improve the construction and mode of operation of the nut cracking mechanism in order to render the operation of the machine efficient for all of its intended purposes.

Other objects will appear from the following description, reference being made to the accompanying drawings, in which—

Fig. 1 is a plan view of the machine containing one embodiment of the invention.

Fig. 2 is a side elevation of the same with the hopper in section.

Fig. 3 is a vertical sectional view taken on the line 3—3 of Fig. 2.

Fig. 4 is a vertical sectional view taken on the line 4—4 of Fig. 2.

Fig. 5 is a vertical longitudinal sectional view of the nut cracking mechanism.

Fig. 6 is a perspective view of a device for ejecting the cracked nuts from the nut cracking mechanism.

Fig. 7 is a perspective view of two of the stationary cracking members, both of said members being alike and contained in the duplex machine shown.

Fig. 8 shows a detail of the mechanism for actuating the carriage supporting the movable cracking members.

Fig. 9 is a plan view of the nut supporting member that supports the nuts during the cracking operation, the nut cracking members being shown in section.

Figs. 10, 11 and 12 are plan, side and end elevations respectively of the shuttle device that receives the nuts from the delivery chute for delivery to the supporting shuttle that supports the nuts during the cracking operation.

Fig. 13 is a sectional view on the line 13—13 of Fig. 1.

Fig. 14 is a detailed view with parts in section showing the conveyor entering the nut containing hopper and the device for preventing the nuts from dropping through the conveyor opening in the bottom of the hopper.

Fig. 15 is a view enlarged relative to Fig. 1, showing a construction and organization of the invention designed and adapted for cracking hard shell nuts, such as Brazil nuts, walnuts and hickory nuts.

Fig. 16 is a side elevation of the mechanism shown in Fig. 15.

Fig. 17 (Sheet 1) is an enlarged view showing an ejector on the conveyor serving to prevent more than one nut from becoming lodged on a nut holder.

The machine in which the present embodiment of the invention is shown, comprises a pair of side frames 1 having at one end a hopper 2 for containing the nuts to be cracked.

The machine shown is a duplex or two unit machine having a capacity for cracking two nuts at each operation of the cracking devices, but it is clear that the machine may be constructed with any desired capacity and I do not restrict myself in this or other unessential particulars.

The machine is provided with a conveyor for each unit. As shown, each conveyor comprises a chain 3 engaging and being operated by the sprocket wheels 4 attached to a shaft 5 rotatively supported near the upper edge of the inclined inner wall of the hopper 2. The chains also pass around rollers 6 below the hopper. The rollers 6 are on a horizontal shaft 7 having its ends mounted in guides 8 in which the shaft is capable of movement toward and away from the shaft 5. The shaft 7 is pressed downwardly by springs 9 (Fig. 2) which hold the conveyor chains 3 under proper tension. The conveyor chains 3 pass through openings 10 in the bottom wall of the hopper 2 adjacent to the inclined inner wall of the hopper and operate in channels or guides 11 in the inner wall of the hopper.

The nut holders on the conveyor chains comprise bifurcated arms 12 each having a recess 13 for the reception of a nut (Figs. 1 and 14). Pins 14 project into the openings 10 to prevent the nuts from dropping through and to permit the nut holders 12 to pass as will be readily understood by reference to Fig. 14. The conveyor chains 3 have ejectors in the form of knobs 15 thereon adjacent to the nut holders 12 to prevent lodgment of more than one nut on each nut holder. The shaft 5 supports a radial pin 15ª at the side of each conveyor chain which cooperate with the ejectors 15 to prevent lodgment of more than one nut on the nut holders 12 and to cause proper discharge of the nuts from the conveyors. Thus, the nuts are discharged one at a time by each conveyor as the nut holders 12 pass over the sprocket wheels 4. The nuts are discharged into inclined chutes 16 having hinged plates 17 onto which the nuts drop from the nut holders and which are engaged by the nut holders successively and actuated downwardly until the nut holders pass. The plates 17 are attached to a rockable rod 18 (Figs. 1 and 2) having pins 19 on its ends to which springs 20 are connected for closing the plates 17. The pins 19 engage stops 21 to hold the plates 17 in proper position.

From the chute 16 the nuts pass to a shuttle consisting of a relatively narrow trough or groove 22 for each cracking device. The grooved shuttle 22 has an arm 23 (Figs. 5 and 10) extending to a connection with a block 24 in connection with another shuttle 25 having troughs or grooves 26 for receiving the nuts discharged thereto from the troughs 22. The shuttle in which the troughs 22 are formed is moved back and forth under a wiper plate 27 (Figs. 1 and 2) which serves to wipe the nuts from the troughs 22 and cause the nuts to drop into the troughs 26. These various movements of the nuts serve to dispose them longitudinally in the troughs 26 between the cracking elements.

Each cracking device includes a stationary jaw or anvil and a reciprocating jaw or crusher that is moved axially toward and away from the stationary jaw or anvil to crack the nuts between them. The stationary jaws or anvils 28 are attached to a rigid part 29 (Fig. 5) of the frame and each is provided with a central axial bore 30, a slot 31 opening into the axial bore, and a recess or concavity 32 in its end. In the embodiment shown each reciprocating jaw or crusher comprises a bar 33 and a head 34 on the end thereof toward the cooperating stationary jaw or anvil 28. The bar 33 and the head 34 have a central bore 35, a slot 36 opening into the bore, and said bore and slot communicate with a concavity or recess 37 in the end of the head 34.

The movable jaws or crushers are supported in a reciprocating carriage 38 having supporting legs 39 (Fig. 3) operating upon rail or track members 40 in connection with the frames of the machine. The carriage is held from displacement by members 41 extending over projecting portions of the legs 39.

A shaft 42 (Figs. 1 and 2) is rotatively supported at the opposite end of the machine from the hopper 2 and may be rotated by any desired driving connections as by a train of reduction gearing 43 driven by a motor 44. A rod or bar 45 has one end pivoted upon a support 46 in the carriage 38 and the other end pivoted eccentrically to a large gear wheel 47 on the shaft 42. Thus the carriage 38 is reciprocated by continuous rotation of the wheel 47 in one direction, with the result that the movable members of the cracking devices are moved toward and away from the stationary jaws or anvils 28 to crack the shells of the nuts. An arm 48 extends upwardly from the bar or rod 45 and is oscillated thereby. A rod 49 has one end extending loosely through a block 50 pivotally supported by the upper end of the arm 48 and the opposite end pivoted to the block 34. A head 51 on the end of the rod 49 is engaged by the block 50 so that further swinging movement of the arm 48 from the position shown in Fig. 2 causes the rod 49 to move the shuttle 25 toward the carriage 38 and to position to receive the nuts wiped from the troughs 22 by the wiper plate 27.

The ends of the bars 33 opposite from the heads 34 have thrust members 52 pivoted thereto. The free ends of the thrust members 52 are curved eccentrically with respect to the axis of their pivots and here resides a highly important feature of the present invention because it is due, in a large part, to the novel construction and arrangement of said thrust members and their associated parts that I am enabled to crack either fragile or hard shell nuts without crushing or breaking more than a very small proportion of the nut kernels. The radius of curvature of the ends of the thrust members is of gradually increasing length from the upper corners of the thrust members to a point near the lower corners of the thrust members, and from the point of longest radius the curvature is somewhat abrupt to the lower edges or corners of the thrust members. By this construction a quick release of the thrust members from their rotary abutments is obtained in the case of either fragile or hard shell nuts and such release is obtained at the moment the shells are properly broken and before the kernels are crushed or broken. The free ends of the thrust members are supported upon an adjustable supports 53 so that the moment of release of the thrust members may be varied, as desired. The support 53 (Fig. 13) is mounted upon adjustable supporting screws 54 mounted in a part of the machine frame and having their heads seated in appropriate recesses in the under side of said support 53. Displacement of the support 53 is prevented by a set screw 55 passing through said support and engaging a part of the machine frame. Holes 56 through the support 53 are provided to receive a screw driver for the purpose of adjusting the screws 54 without removing said support 53. Leaf springs 57 attached to the carriage 38 yieldingly hold the thrust members 52 downwardly.

A shaft 58 is rotatively supported by the carriage 38 and has a disc or roller 59 rigid thereon for each of the thrust members 52. A pinion 60 on the shaft 58 meshes with a stationary rack 61 and serves to rotate the shaft 58 alternately in opposite directions according to the direction of movement of the carriage 38. During movement of the carriage 38 toward the stationary jaws or anvils 28 the shaft 58 and rollers 59 are rotated in a direction tending to raise the free ends of the thrust members 52. The free ends of the thrust members 52 are raised at the proper time when the shells of the nuts are cracked and in time to prevent crushing of the nut kernels. During the cracking operation another nut is discharged into each of the shuttle troughs 22 and, as the shuttle 25 is returned by the rod 49 to its advanced or receiving position, the nuts are wiped from the shuttle 22 onto the shuttle 25. The shaft 5 is rotated from the shaft 42 in order to cause the conveyors to deliver nuts at the proper time, such operation being effected by a chain 62 engaging sprocket wheels 63 and 64 on the shafts 42 and 5 respectively. During the final stages of the cracking operation the shuttle 25 is pushed from nut receiving position to which the rod 49 had drawn it, by a projection 65 on the carriage 38. The receiving shuttle 22 which is rigid with the supporting shuttle 25 has a slot 66 (Figs. 5 and 10) receiving a screw 67 on the carriage 38. This assists in holding the parts in proper relationship and permits the necessary relative movements of the shuttle 25 with respect to the carriage 38 and the shuttle 22.

From the foregoing it will be seen that the thrust members 52 serve to impart a final quick impulse movement to the cracking element 33—34 and that the extent of such movement may be varied by raising or lowering the support 53. By placing the support 53 in a higher adjustment the high points on the curved ends of the thrust members 52 will contact with the rollers 59 so that a short quick movement will be imparted to the cracking device 33—34, thus adapting the machine for cracking nuts with fragile shells. By adjusting the support 53 in a lower position shorter points on the ends of the thrust members 52 contact with the roller 59 so that a greater movement is imparted to the cracking device 33—34. This adapts the machine for cracking hard shell nuts and it will be seen that these thrust devices have a direct relation to the projection 55 which engages the supporting shuttle 25 since, when the projection 65 engages the supporting shuttle 25, movement of the carriage 38 relative to the supporting shuttle is stopped. Hence when the movement of the cracking device 33—34 is varied relative to the carriage 38 the same variation is effected relative to the supporting shuttle 25.

As the carriage 38 moves away from the shuttle 25 the direction of rotation of the shaft 58 and the rollers 59 is reversed, with the result that the thrust members 52 are returned to their lower position on the support 53. The cracked nuts are ejected from the shuttle 25 to a conveyor 68 (Fig. 2). Pins 69 (Figs. 5, 11 and 12) in connection with the shuttle 22 extend through the slots 36 into the axial bores 35 and displace adhering or lodged portions of the nuts from the movable jaws or crushers.

An ejector is provided for ejecting the nuts positively from the stationary jaws or anvils 28 and to assist in dislodging them from the shuttle 25. Said ejector consists of a plate 70 mounted on the machine frame and held in place by a screw 71 passing through a slot 72 in the plate (Figs. 1, 5 and 6) and permitting sliding movement of said plate. The plate 70 has fingers 73 extending through the slots 31 into the central bores 30 in the stationary jaws or anvils 28 so that when the ejector plate is moved in the proper direction the nuts will be positively ejected. The plate 70 has a depending portion 74 to which one end of a rod 75 is connected. The rod 75 terminates at one side of the wheel 47 and has a roller 76 thereon which is intermittently engaged by the inner face of a cam 77 on the wheel 47 as the wheel 47 rotates in the direction of the arrow shown on said wheel in Fig. 2. The cam 77 draws the rod 75 to the position in which it is shown in dotted lines in Fig. 2, thereby moving the ejector fingers 73 to the position in which they are shown in dotted lines in Fig. 2, thereby positively ejecting the nuts. The cam 77 passes from engagement with the roller 76, whereupon a cam 78 on the wheel 47 engages the roller and pushes the rod 75 in a direction to restore the ejector to its first position.

The invention, as shown in Figs. 15 and 16, dispenses with the use of the shuttle 22 and in place thereof has leaf springs 79 attached to the carriage 38, one such leaf spring being provided for each cracking mechanism. The leaf springs 79 have end portions 80 extending obliquely upwardly into the chute 16 so as to permit the nuts to pass to the shuttle 25 when the latter is in nut receiving position. The leaf springs 80 serve to dispose and place the nuts longitudinally in the troughs 26 of the shuttle 25 in position for operation of the cracking mechanism.

As the carriage 38 approaches the end of its movement away from the shuttle 25, projections 81 on the bars 33 contact with abutments 82 while the carriage proceeds to the end of its movement. This enables the springs 57 to press the thrust members 52 downwardly to the support 53 in position for further operation by the rollers 59.

From the foregoing description of the construction of the machine it will be seen that the nuts are conveyed singly from the hopper 2 to the respective cracking devices. In machines in which the shuttle 22 is employed in connection with the shuttle 25, the nuts are first received in the shuttle 22 and are wiped therefrom to the shuttle 25. The movement of the carriage 38 causes the nuts to be gripped between the stationary jaws or anvils 28 and the movable cracking elements, each of which comprises parts 33 and 34. The movement of these parts is sufficient to crush and break the shells of the nuts, but at the proper time the thrust members 52 are raised by the rotating rollers 59 relieving the pressure against the nuts before the kernels are crushed or broken. During return movement of the carriage 38 the ejectors 69 for the movable cracking elements 33—34, and the ejectors 73 for the stationary jaws or anvils 28, cause the cracked nuts to drop through the space between the shuttle 25 and the carriage 38 onto the conveyor 68 if the same be used, or into any desired receptacle that may be placed in position to receive the cracked nuts. During the movement of the carriage 38 away from the shuttle 25 the shuttle 25 is moved by the rod 49 and its operating connections to position to receive nuts wiped from the shuttle 22. By raising or lowering the support 53 the duration of operative contact between the rollers 59 and the thrust members 52 can be varied as desired. The concaved faces of the cracking elements assist in seating the nuts in proper position and the longitudinal bores in the cracking elements provide clearance for the ends of the nuts and form annular shoulders through which the pressure is applied to the shells of the nuts at points concentric with the axes of the nuts, instead of at their ends. In this way, the shell is more effectively cracked at more uniform pressure.

The springs 79 will yield to the pressure of the cracked shells of the nuts below them and exert sufficient pressure against the upper sides of the cracked nuts to eject them at the proper time. This arrangement is highly efficient in the case of hard shell nuts, although either the shuttle 22 or the springs 79 function to place hard shell nuts or fragile shell nuts very satisfactorily.

From the foregoing it will be seen that my invention accomplishes all of its intended objects and purposes in a highly efficient and satisfactory manner. Since the machine is designed and adapted for cracking nuts with fragile shells as well as the hard shell nuts it is a distinct advance in the art, as other machines heretofore in general use are not so designed and adapted.

I am aware that the invention may be varied in numerous equivalent particulars without departure from the nature and principle of the inventive idea. I do not restrict myself unessentially, but what I claim and desire to secure by Letters Patent is:—

1. A nut cracking machine comprising a shuttle for supporting nuts to be cracked, a rigid jaw, a jaw movable to and from said rigid jaw to crack nuts placed successively upon said shuttle, a chute, a shuttle having a longitudinal groove of less width than the length of the nuts received from said chute and arranged to support the nuts above the plane of said jaws, means for moving said second shuttle, and a wiper for discharging the nuts from the end of the second shuttle to the first shuttle in positions in which the ends of the nuts are toward said jaws respectively.

2. A nut cracking machine comprising a shuttle, a rigid jaw extending above said shuttle, a jaw movable toward the rigid jaw to crack nuts placed upon said shuttle between said jaws, a second shuttle supported above the first shuttle and having a longitudinal groove of less width than the length of the nuts to be cracked, a connection between said shuttles holding the second shuttle in position in which its discharge end is above the first shuttle, a chute for conducting nuts to the second shuttle, means for operating said shuttles, a device for pushing nuts from the second shuttle onto the first shuttle when said shuttles are moved as aforesaid with the ends of the nuts toward the ends of said jaws respectively, and means for operating the movable jaws to crack said nuts.

3. A nut cracking machine comprising a shuttle, a rigid jaw extending above said shuttle, a jaw movable toward the rigid jaw to crack nuts placed upon said shuttle between said jaws, a second shuttle supported above the first shuttle and having a longitudinal groove of less width than the length of the nuts to be cracked, a connection between said shuttles holding the second shuttle in position in which its discharge end is above the first shuttle, a chute for conducting nuts to the second shuttle, means for operating said shuttles, a device for pushing nuts from the second shuttle onto the first shuttle when said shuttles are moved as aforesaid with the ends of the nuts toward the ends of said jaws respectively, means for operating the movable jaw to crack said nuts, and means in connection with said second jaw for ejecting nuts from said movable jaw.

4. A nut cracking machine comprising a shuttle, a rigid jaw extending above said shuttle, a jaw movable toward and away from said rigid jaw to crack nuts placed between them on said shuttle, a device for receiving nuts to be placed on said shuttle, means for moving nuts from said device to said shuttle, means for operating said movable jaw, and means supported by said device for ejecting nuts from said movable jaw.

5. A nut cracking machine comprising a shuttle, a rigid jaw extending above said shuttle, a jaw movable toward and away from said rigid jaw to crack nuts placed between them on said shuttle, a device for receiving nuts to be placed on said shuttle, means for moving nuts from said device to said shuttle, means for operating said movable jaw, means supported by said device for ejecting nuts from said movable jaw, and means for ejecting nuts from said rigid jaw and from said shuttle.

6. A machine of the character described comprising nut cracking mechanism, a device for delivering nuts to be cracked to said nut cracking mechanism, an element for ejecting nuts from one part of said cracking mechanism, and means supported by said device for ejecting nuts from another part of said cracking mechanism.

7. In a nut cracking machine, a rigid jaw having a slot therein, a movable jaw having a slot therein, a shuttle for supporting nuts between said rigid and movable jaws, mechanism for operating the movable jaw to crack nuts upon said shuttle, an element operating in the slot in said rigid jaw to eject nuts therefrom and from said shuttle, and an element operating in the slot in said movable jaw to eject nuts therefrom.

8. In a nut cracking machine, a chute, a shuttle having a groove for receiving nuts from said chute and being of narrower width than the length of the nuts received thereby, a second shuttle extending under one end of said first shuttle and arranged to receive nuts discharged from said first shuttle, a rigid jaw extending over said second shuttle, a jaw movable toward and from said rigid jaw to crack nuts upon said second shuttle between said jaws, mechanism for operating said shuttles, and a device operated by one of said shuttles for ejecting nuts from said movable jaw.

9. In a nut cracking machine, a chute, a shuttle having a groove for receiving nuts from said chute and being of narrower width than the length of the nuts received thereby, a second shuttle extending under one end of said first shuttle and arranged to receive nuts discharged from said first shuttle, a rigid jaw extending over said second shuttle, a jaw movable toward and from said rigid jaw to crack nuts upon said second shuttle between said jaws, mechanism for operating said shuttles, a device operated by one of said shuttles for ejecting nuts from said movable jaw, and means for ejecting nuts from said rigid jaw and from said second shuttle.

ROBERT E. WOODSON.